United States Patent
Lee

(10) Patent No.: US 9,767,560 B2
(45) Date of Patent: Sep. 19, 2017

(54) WORK MODE CONTROL METHOD AND OPTICAL ENCODER USING THE SAME

(71) Applicant: PIXART IMAGING (PENANG) SDN. BHD., Penang (MY)

(72) Inventor: Siew-Chin Lee, Penang (MY)

(73) Assignee: PIXART IMAGING (PENANG) SDN. BHD., Penang (MY)

( * ) Notice: Subject to any disclaimer, the term of this patent is extended or adjusted under 35 U.S.C. 154(b) by 159 days.

(21) Appl. No.: 14/885,780

(22) Filed: Oct. 16, 2015

(65) Prior Publication Data

US 2017/0109887 A1      Apr. 20, 2017

(51) Int. Cl.
| | |
|---|---|
| G06T 7/00 | (2017.01) |
| G01D 5/347 | (2006.01) |
| H04N 5/235 | (2006.01) |
| H04N 5/232 | (2006.01) |
| H04N 5/30 | (2006.01) |
| G06F 3/03 | (2006.01) |

(52) U.S. Cl.
CPC ........... *G06T 7/0018* (2013.01); *G01D 5/347* (2013.01); *G06F 3/0317* (2013.01); *H04N 5/2351* (2013.01); *H04N 5/2353* (2013.01); *H04N 5/2354* (2013.01); *H04N 5/23245* (2013.01); *H04N 5/30* (2013.01); *G06T 2207/10004* (2013.01)

(58) Field of Classification Search
CPC .... G06F 3/0383; G06F 1/3259; G06F 1/3203; G06T 7/0018; G01D 5/347
USPC .................................. 250/231.13, 221, 214 R
See application file for complete search history.

(56) References Cited

U.S. PATENT DOCUMENTS 9,329,702 B2 * 5/2016 Song .................... G06F 3/03543

* cited by examiner

*Primary Examiner* — Que T Le
(74) *Attorney, Agent, or Firm* — Li & Cai Intellectual Property (USA) Office

(57) ABSTRACT

The present disclosure illustrates a work mode control method. The work mode control method includes the following steps. First, capturing an image once every capturing interval. Next, determining a shutter time, an average brightness and an image quality in response to the images. The shutter time is associated with a frequency of the optical encoder to capture the images. The average brightness is associated with a brightness of environmental light sensed by the optical encoder. The image quality is associated with clarity of the images. Then, adjusting a work mode of the optical encoder in response to the shutter time, the average brightness and the image quality. Finally, controlling the optical encoder to enter a rest mode when the shutter time is higher than a first threshold, the average brightness is higher than a second threshold, and the image quality is lower than a third threshold.

10 Claims, 5 Drawing Sheets

WORK MODE CONTROL METHOD AND OPTICAL ENCODER USING THE SAME

BACKGROUND

1. Technical Field

The present disclosure relates to a work mode control method for an optical encoder, in particular, to the work mode control method which can adjust a work mode of the optical encoder based on a current environment, and the optical encoder using the same.

2. Description of Related Art

With the development of technology, optical encoders have become popular. The most common optical encoder is an optical mouse. Users can control a cursor displayed on an electronic device through the optical mouse, wherein the electronic device is such as a desktop computer or a notebook computer.

The optical encoder usually includes a lighting circuit and an image sensor having a miniature digital camera, wherein the lighting circuit is configured for operatively irradiating a working surface. The image sensor includes an image sensing array, and the image sensing array includes a plurality of pixels to capture images associated with a part of the working surface irradiated by the lighting circuit. According to the captured images, a control circuit of the optical encoder outputs a control signal to the electronic device, such that the electronic device implements a corresponding function.

In order to save power, an optical encoder which can adjust work mode based on current environment is developed, as the current optical encoder cannot accurately determine the environment to decrease power consumption.

SUMMARY

An exemplary embodiment of the present disclosure provides a work mode control method for an optical encoder. The work mode control method comprises the following steps. Step a: capturing an image once every capturing interval. Step b: determining a shutter time, an average brightness and an image quality in response to the images. The shutter time is associated with a frequency of the optical encoder to capture the images. The average brightness is associated with a brightness of an environmental light sensed by the optical encoder. The image quality is associated with clarity of the images. Step c: adjusting a work mode of the optical encoder in response to the shutter time, the average brightness and the image quality. Step d: controlling the optical encoder to enter a rest mode when the shutter time is higher than a first threshold, the average brightness is higher than a second threshold, and the image quality is lower than a third threshold.

An exemplary embodiment of the present disclosure provides an optical encoder. The optical encoder comprises an image sensing array, a determining circuit and a control circuit. The determining circuit is coupled to the image sensing array. The control circuit is coupled to the determining circuit. The image sensing array is configured for operatively capturing an image once every capturing interval. The determining circuit is configured for operatively receiving the images and determining a shutter time, an average brightness and an image quality in response to the images. The shutter time is associated with a frequency of the optical encoder to capture the images. The average brightness is associated with a brightness of environmental light sensed by the optical encoder. The image quality is associated with clarity of the images.

In summary, the work mode control method and the optical encoder using the same provided by the instant disclosure can accurately determine the operating state of the optical encoder. As the optical encoder is put in the abnormal state, the optical encoder is switched to the rest mode to save power. The control circuit is configured for operatively adjusting a work mode of the optical encoder in response to the shutter time, the average brightness and the image quality. The control circuit controls the optical encoder to enter a rest mode when the shutter time is higher than a first threshold, the average brightness is higher than a second threshold, and the image quality is lower than a third threshold.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
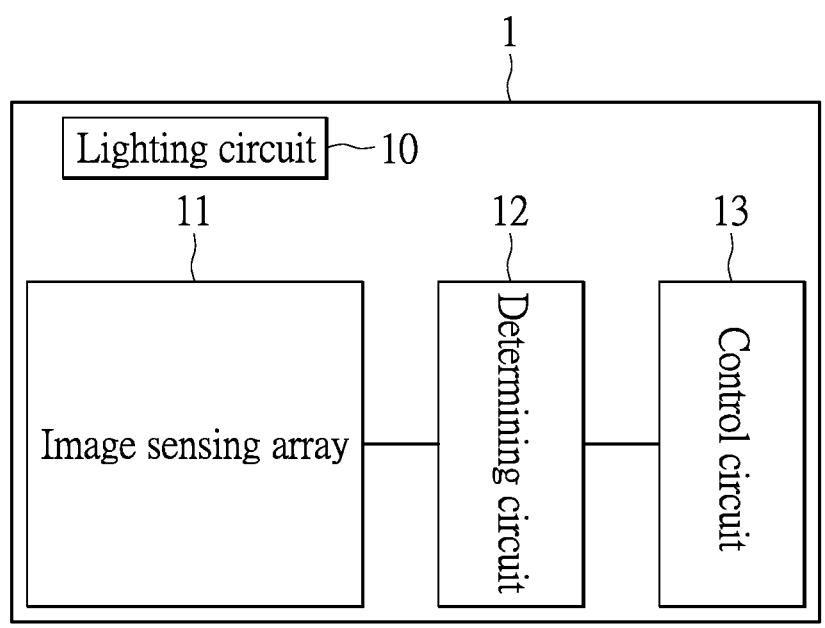
FIG. 1 shows a block diagram of an optical encoder of one embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Notably, the terms first, second, third, etc., may be used herein to describe various elements or signals, but these signals should not be affected by such elements or terms. Such terminology is used to distinguish one element from another or a signal with another signal. Further, the term "or" as used herein in the case may include any one or combinations of the associated listed items.

Please refer to FIG. 1. FIG. 1 shows a block diagram of an optical encoder of one embodiment of the present disclosure. An optical encoder 1 includes a lighting circuit 10, an image sensing array 11, a determining circuit 12 and a control circuit 13. The image sensing array 11 is coupled to the determining circuit 12. The control circuit 13 links with an electronic device via wireless communication or wire communication, wherein the electronic device is such as a desktop computer or a notebook computer.

The optical encoder 1 is such as an optical mouse, a smart watch or a joystick. Users can operate the optical encoder 1 to control the electronic device connected with the optical encoder 1, or control the optical encoder 1 to generate a corresponding result. In the exemplary embodiment, the optical encoder 1 is a kind of optical mouse.

The lighting circuit 10, such as a light emitting diode, comprises suitable logic, circuitry, interfaces and/or code operable to provide a light beam to irradiate a working surface which the optical encoder 1 is working on.

The image sensing array 11 includes a plurality of pixels. Generally, the image sensing array 11 is correspondingly disposed to the working surface. The image sensing array 11 receives the reflected light which the working surface has reflected from the light beam, and captures an image associated with a part of the working surface according to the reflected light once every capturing interval.

The determining circuit 12 comprises suitable logic, circuitry, interfaces and/or code operable to receive the images outputted by the image sensing array 11, and determines a current operating state of the image sensing array 11 in response to the images.

To put it concretely, the determining circuit 12 determines a shutter time, an average brightness of the light beam and an image quality of each image in response to the image. The shutter time represents a turning-on time of the image sensing array 11 that the image sensing array 11 is turned on and starts to capture the images. In other words, the shutter time is associated with how much light beam the working surface reflects to the image sensing array 11. If a color of the working surface is a bright color, such as a white paper, the more light beam is reflected to the image sensing array 11. At this moment, the shutter time is decreased. If the color of the working surface is dark color, such as a dark paper, most of the light beam is absorbed by working surface. Then, the optical encoder 1 increases the shutter time. Or, if the optical encoder 1 is lifted, the image sensing array 11 receives only a little reflected light, and then the shutter time is also increased.

The determining circuit 12 can determine the current shutter time using a first threshold. If the shutter time is higher than the first threshold, the determining circuit 12 determines the shutter time is high, and outputs a first determining signal with logic high level. In contrast, if the shutter time is lower than the first threshold, the determining circuit 12 determines the shutter time is low, and outputs a first determining signal with logic low level.

The light beam sensed by the image sensing array 11 may be the reflected light provided by the working surface. Or, when an operating state of the optical encoder 1 changes, the light beam sensed by the image sensing array 11 may be environmental light provided by another light source, wherein the operating state is associated with how the user uses the optical encoder 1. Based on the captured images, the determining circuit 12 can calculate the average brightness of the light beam irradiating on the image sensing array 11. The determining circuit 12 can determine the current average brightness using a second threshold. If the average brightness is higher than the second threshold, the determining circuit 12 determines the average brightness is high, and outputs a second determining signal with logic high level. In contrast, if the average brightness is lower than the second threshold, the determining circuit 12 determines the average brightness is low, and outputs a second determining signal with logic low level.

Generally, the shutter time is inversely proportional to the average brightness sensed by the image sensing array 11. When the average brightness decreases as sensed by the image sensing array 11, the control circuit 13 increases the shutter time. Due to the image sensing array 11 has longer time to collect the light beam, the image sensing array 11 captures brightness images.

The image quality is associated with clarity of each image. The higher the clarity, the higher the image quality is. The determining circuit 12 can determine the current image quality using a third threshold. If the image quality is higher than the third threshold, the determining circuit 12 determines the image quality is high, and outputs a third determining signal with logic high level. In contrast, if the image quality is lower than the third threshold, the determining circuit 12 determines the image quality is low, and outputs a third determining signal with logic low level.

Furthermore, the determining circuit 12 can determine the image quality by comparing the two images captured by two proximate pixels. When the brightness of the two images are very different, such as the brightness of one of the images is high and the brightness of the other one of the images is low, the determining circuit 12 determines that the environmental light correctly focuses on the image sensing array 11, such that the two images captured by the two proximate pixels can show the brightness difference clearly. Accordingly, the determining circuit 12 outputs the third determining signal with logic high level.

To sum up, the determining circuit 12 can determine the shutter time, the average brightness and the image quality in response to the images outputted by the image sensing array 11, and then outputs determining signals to the control circuit 13.

The control circuit 13 comprises suitable logic, circuitry, interfaces and/or code operable to receive the determining signals outputted by the determining circuit 12, and controls a work mode of the optical encoder 1 correspondingly. For example, if all of the first, second and third determining signals are logic high level, the control circuit 13 determines that the optical encoder 1 is now normally working. Next, the control circuit 13 controls the optical encoder 1 to enter an active mode, and provides power to each element disposed in the optical encoder 1. On the other hand, according to the operating state of the optical encoder 1, the control circuit 13 can switch the optical encoder 1 to enter a rest mode, and selectively stops providing power to a part of the elements disposed in the optical encoder 1. Accordingly, the optical encoder 1 can decrease power consumption.

Figure 2:
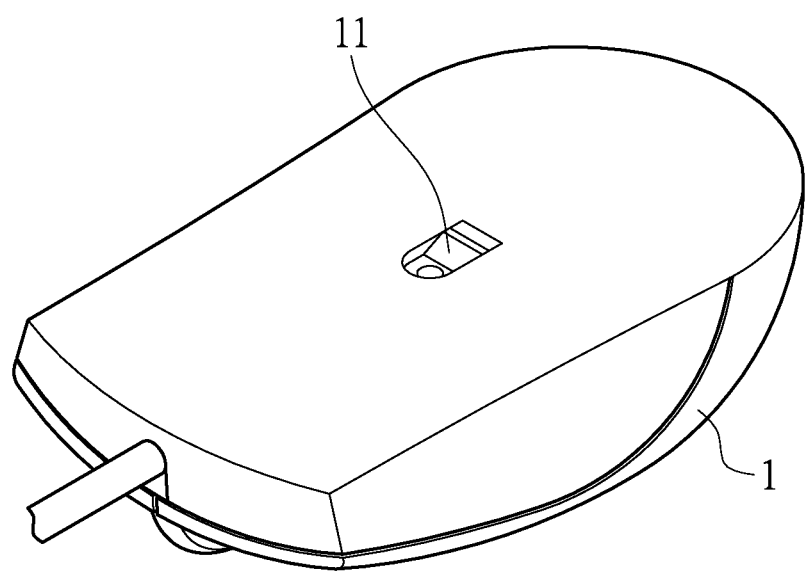
FIG. 2 shows a schematic diagram of an optical encoder in an abnormal state of one embodiment of the present disclosure.

Please refer to FIG. 2. FIG. 2 shows a schematic diagram of an optical encoder in an abnormal state of one embodiment of the present disclosure. The user can put the optical encoder 1 into the operating state shown in FIG. 2 when the user does not want to use the optical encoder 1. The optical encoder 1 looks like an inverted turtle at this moment, so hereafter this abnormal state is referred to as "turtle state".

When the optical encoder 1 is in the turtle state, the image sensing array 11 faces the environmental light directly. In other words, the image sensing array 11 is directly irradiated by the environmental light instead of receiving the reflected light provided by the working surface. The optical encoder 1 increases the shutter time of the image sensing array 11 because of the environmental light directly irradiates the image sensing array 11. Then, the determining circuit 12 outputs the first determining signal with logic high level.

On the other hand, the average brightness sensed by the image sensing array 11 increases because the environmental light directly irradiates the image sensing array 11, and the brightness of the images captured by the image sensing array 11 also increases. Then, the determining circuit 12 outputs the second determining signal with logic high level.

Incidentally, the average brightness is also associated with the material of the working surface. When the optical encoder 1 is in normal working state instead of in the turtle state, the image sensing array 11 receives the reflected light provided by the working surface. The brightness of the reflected light increases when the color of the working surface is too light, or the working surface easily reflects the light beam, such that the average brightness sensed by the image sensing array 11 increases.

Next, due to the environmental light directly irradiating on the image sensing array 11, the environmental light is unable to focus on the image sensing array 11. The image sensing array 11 captures only fuzzy images which have low image quality. Then, the determining circuit 12 outputs the third determining signal with logic low level.

After receiving the first, second determining signals with logic high level and the third determining signal with logic low level, the control circuit 13 determines the optical encoder 1 is in the turtle state shown in FIG. 2, and controls the optical encoder 1 to enter the rest mode. In brief, the control circuit 13 automatically switches the optical encoder 1 to enter the rest mode to save power as long as the user puts the optical encoder 1 in the turtle state.

In the exemplary embodiment, the control circuit 13 controls the optical encoder 1 to enter the rest mode when the control circuit 13 receives the first, second determining signals with logic high level and the third determining signal with logic low level. However, the present invention is not limited thereto. Those skilled in the art can design a switch condition based on need, such that the control circuit 13 switches the optical encoder 1 to enter the rest mode if the first, second and third determining signals meet the switch condition. For example, the control circuit 13 controls the optical encoder 1 to enter the rest mode when the control circuit 13 receives the first, second and third determining signals with logic low level.

In the above exemplary embodiment, the determining circuit 12 determines whether the optical encoder 1 is in the abnormal state based on the images captured by the image sensing array 11. Notably, in another exemplary embodiment, the determining circuit 12 further obtains a brightness waveform diagram through detecting the brightness of the environmental light, and determines whether the optical encoder 1 is in the abnormal state based on the brightness waveform diagram.

Figure 3:
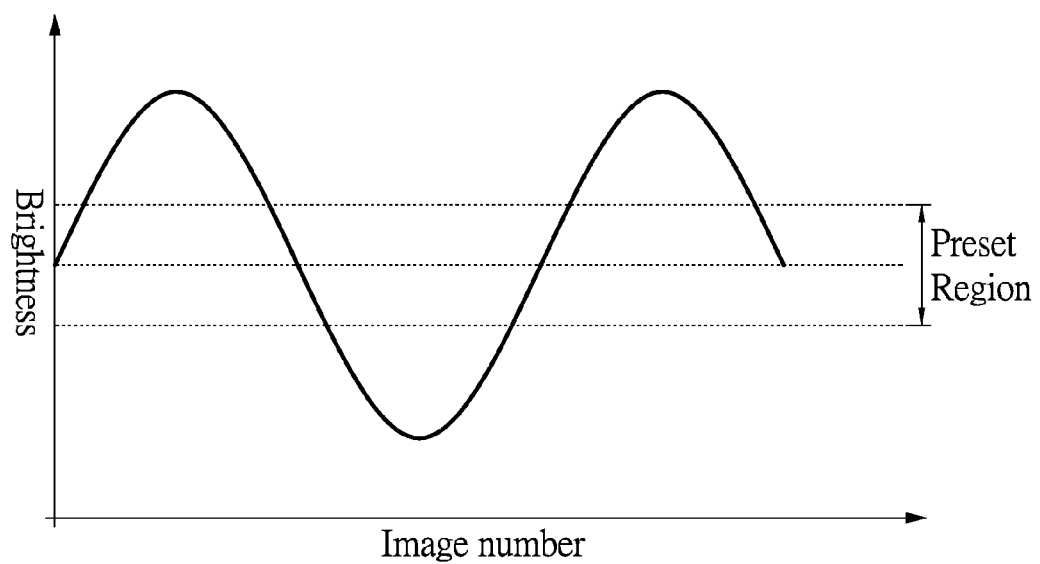
FIG. 3 shows a brightness waveform diagram of environmental light sensed by an optical encoder of one embodiment of the present disclosure.

Please refer to FIG. 3. FIG. 3 shows a brightness waveform diagram of an environmental light sensed by an optical encoder of one embodiment of the present disclosure. In FIG. 3, the vertical axis of the brightness waveform diagram represents the brightness of the environmental light, and the horizontal axis of the brightness waveform diagram represents the number of the images captured by the image sensing array 11. For example, the image sensing array 11 can capture 2000 images per second, and obtains the brightness waveform diagram based on these images.

The environmental light is not maintained at the same brightness, but the human eye can not detect the environmental light is flashing. The brightness waveform diagram of the environmental light is similar to a waveform diagram of a sinusoidal wave. According to the images captured by the image sensing array 11, the determining circuit 12 can determine a peak value and a valley value of the brightness of the environmental light, and further calculates a peak-to-valley value of the environmental light.

First, the determining circuit 12 determines the shutter time, the average brightness and the image quality according to the above steps to generate the first, second and the third determining signals, such as the first and second determining signals with logic high level and the third determining signal with logic low level. Next, the determining circuit 12 calculates the peak value and the valley value of the environmental light, and further obtains the peak-to-valley value in response to the peak value and the valley value. If the peak-to-valley value does not exceed a preset region (such as the preset region shown in FIG. 3), meaning that the brightness of the environmental light is not high enough, the determining circuit 12 outputs a fourth determining signal with logic low level to the control circuit 13. The control circuit 13 will not control the optical encoder 1 to enter the rest mode when the control circuit 13 receives the fourth determining signal with logic low level.

In contrast, if the peak-to-valley value exceeds the preset region, meaning that the brightness of the environmental light is too high, the determining circuit 12 outputs a fourth determining signal with logic high level to the control circuit 13. The control circuit 13 determines that the optical encoder 1 is in the abnormal state (such as the turtle mode shown in FIG. 2). Then, the control circuit 13 controls the optical encoder 1 to enter the rest mode for decreasing power consumption.

Incidentally, the determining circuit 12 calculates the peak-to-valley value in the exemplary embodiment. In another exemplary embodiment, the determining circuit 12 transmits the peak value and the valley value of the environmental light to the control circuit 13, and then the control circuit 13 calculates the peak-to-valley value based upon the peak value and the valley value to switch the optical encoder 1 to a suitable work mode.

Figure 4:
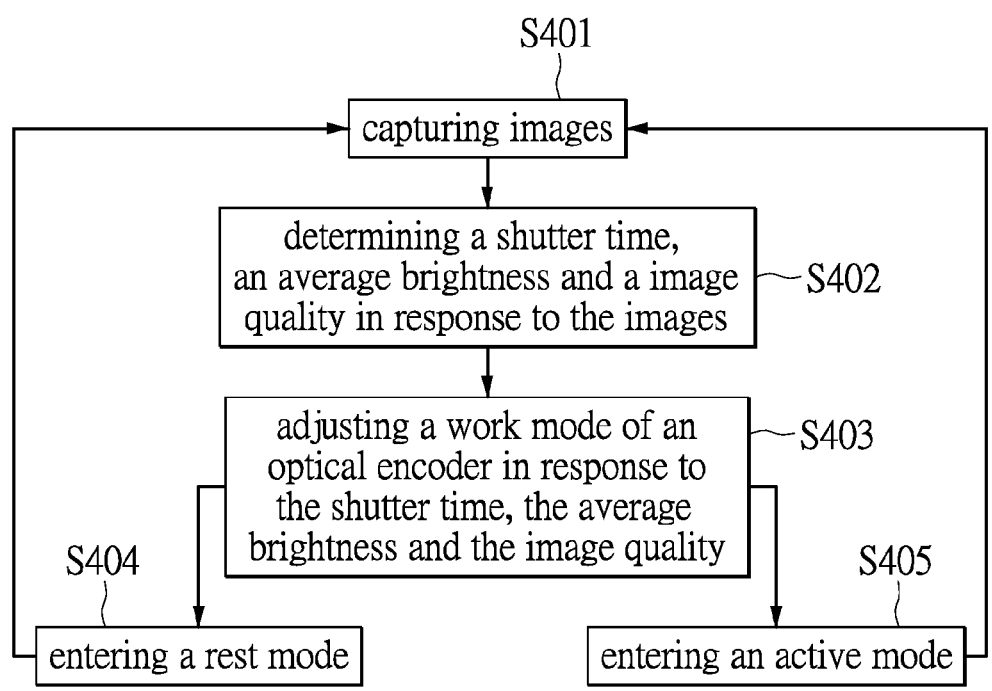
FIG. 4 shows a flow diagram of a work mode control method for an optical encoder of one embodiment of the present disclosure.

Please refer to FIG. 4. FIG. 4 shows a flow diagram of a work mode control method for an optical encoder of one embodiment of the present disclosure. The work mode control method provided in FIG. 4 is suitable for the optical encoder as mentioned above. In step S401, an image sensing array of the optical encoder captures an image once every capturing interval, and transmits the captured image to a determining circuit of the optical encoder. In step S402, the determining circuit determines a shutter time, an average brightness and an image quality in response to the images, and generates first, second and third determining signals.

In step S403, a control circuit adjusts a work mode of the optical encoder in response to the shutter time, the average brightness and the image quality. If the first, second determining signals are with logic high level and the third determining signal with logic low level, the control circuit determines the optical encoder is in an abnormal state now, such as the turtle mode shown in FIG. 2, and then step S404 is executed. Conversely, if the first determining signal is not logic high level, the second determining signal is not logic high level and the third determining signal is not logic low level, step S405 is executed.

In step S404, the control circuit controls the optical encoder to enter a rest mode, and selectively stops providing power to a part of the elements disposed in the optical encoder. Next, return to step S401 for continuing capturing the images and detecting the current operating state of the optical encoder.

In step S405, the control circuit controls the optical encoder to enter an active mode, and provides power to each element disposed in the optical encoder. Next, return to step S401 for continuing capturing the images and detecting the current operating state of the optical encoder.

Notably, in the exemplary embodiment, the control circuit controls the optical encoder to enter the rest mode only when the control circuit receives the first, second determining signal with logic high level and the third determining signal with logic low level. However, the present disclosure is not limited thereto. Those skilled in the art can design the combination of the first, second and the third determining signals to determine other types of abnormal state.

Figure 5:
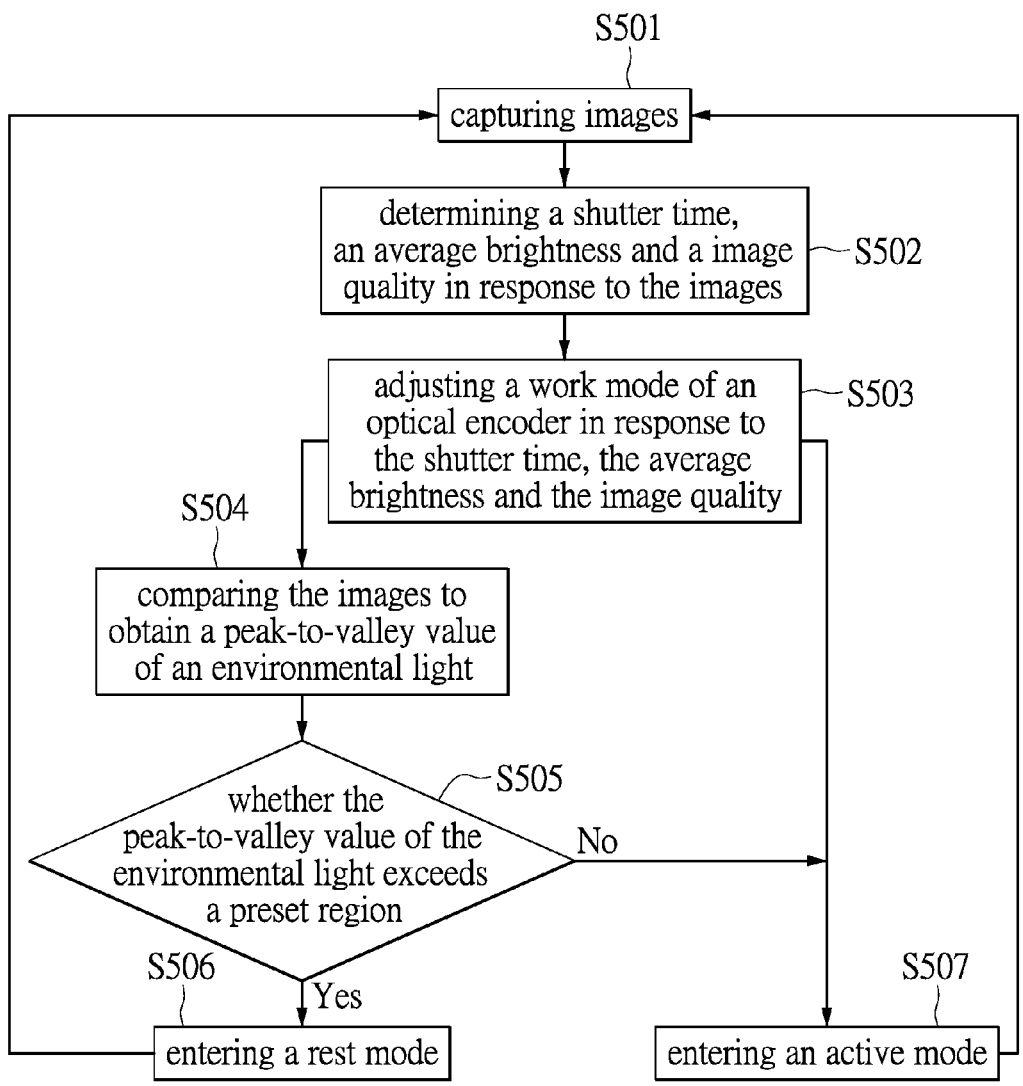
FIG. 5 shows a flow diagram of a work mode control method for an optical encoder of other embodiment of the present disclosure.

Please refer to FIG. 5. FIG. 5 shows a flow diagram of a work mode control method for an optical encoder of another embodiment of the present disclosure. The work mode control method provided in FIG. 5 is also suitable for the optical encoder as mentioned above. In step S501, an image sensing array of the optical encoder captures an image once every capturing interval, and transmits the captured image to a determining circuit of the optical encoder. In step S502, the determining circuit determines a shutter time, an average brightness and an image quality in response to the images, and generates first, second and third determining signals.

In step S503, a control circuit adjusts a work mode of the optical encoder in response to the shutter time, the average brightness and the image quality. If the first, second determining signals are with logic high level and the third determining signal with logic low level, the control circuit determines the optical encoder is in an abnormal state now, such as the turtle mode shown in FIG. 2, and then step S404 is executed for further confirming an operating state of the optical encoder. Conversely, if the first determining signal is not logic high level, the second determining signal is not logic high level and the third determining signal is not logic low level, step S507 is executed.

In step S504, the determining circuit compares the images to obtain a peak value and a valley value of a brightness of an environmental light, and further calculates a peak-to-valley value of the environmental light. In step S505, the control circuit receives the peak-to-valley value, and determines whether the peak-to-valley value exceed a preset region (such as the preset region shown in FIG. 3). If the peak-to-valley value exceeds the preset region, proceed to step S506. If the peak-to-valley value does not exceed the preset region, proceed to step S507.

In step S506, the control circuit controls the optical encoder to enter a rest mode, and selectively stops providing power to a part of the elements disposed in the optical encoder. Next, return to step S501 for continuing capturing the images and detecting the current operating state of the optical encoder.

In step S507, the control circuit controls the optical encoder to enter an active mode, and provides power to each element disposed in the optical encoder. Next, return to step S501 for continuing capturing the images and detecting the current operating state of the optical encoder.

In summary, the work mode control method and the optical encoder using the same provided by the instant disclosure can accurately determine the operating state of the optical encoder. As the optical encoder is put in the abnormal state, the optical encoder is switched to the rest mode to save power.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A work mode control method for an optical encoder, comprising the steps of:
   (a): capturing an image once every capturing interval;
   (b): determining a shutter time, an average brightness and an image quality in response to the images, wherein the shutter time is associated with a time of the optical encoder to capture the images, the average brightness is associated with a brightness of environmental light sensed by the optical encoder, and the image quality is associated with clarity of the images;
   (c): adjusting a work mode of the optical encoder in response to the shutter time, the average brightness and the image quality;
   (d): controlling the optical encoder to enter a rest mode when the shutter time is higher than a first threshold, the average brightness is higher than a second threshold, and the image quality is lower than a third threshold.

2. The work mode control method according to claim 1, wherein the work mode control method further comprises the steps of:
   (e): comparing the images to obtain a peak-to-valley value of the environmental light;
   (f): controlling the optical encoder to ender the rest mode if the peak-to-valley value exceeds a preset region.

3. The work mode control method according to claim 1, wherein when the optical encoder is in an abnormal state, the shutter time is higher than the first threshold, the average brightness is higher than the second threshold, and the image quality is lower than the third threshold, wherein an image sensing array of the optical encoder is directly irradiated by the environmental light when the optical encoder is in the abnormal state.

4. The work mode control method according to claim 3, wherein when the optical encoder is in the abnormal state, the images captured by the image sensing array are fuzzy, and the image quality decreases.

5. The work mode control method according to claim 3, wherein when the optical encoder is in the abnormal state, the environmental light directly irradiates the image sensing array, such that the optical encoder increases the shutter time, and the average brightness sensed by the image sensing array increases.

6. An optical encoder, comprising:
   an image sensing array, configured for operatively capturing an image once every capturing interval;
   a determining circuit, coupled to the image sensing array, configured for operatively receiving the images and determining a shutter time, an average brightness and an image quality in response to the images, wherein the shutter time is associated with a time of the optical encoder to capture the images, the average brightness is associated with a brightness of environmental light sensed by the optical encoder, and the image quality is associated with clarity of the images; and
   a control circuit, coupled to the determining circuit, configured for operatively adjusting a work mode of the optical encoder in response to the shutter time, the average brightness and the image quality;
   wherein the control circuit controls the optical encoder to ender a rest mode when the shutter time is higher than a first threshold, the average brightness is higher than a second threshold, and the image quality is lower than a third threshold.

7. The optical encoder according to claim 6, wherein the determining circuit compares the images to obtain a peak-to-valley value of the environmental light, and the control circuit controls the optical encoder to enter the rest mode if the peak-to-valley value exceeds a preset region.

8. The optical encoder according to claim 6, wherein when the optical encoder is in an abnormal state, the shutter time is higher than the first threshold, the average brightness is higher than the second threshold, and the image quality is lower than the third threshold, wherein an image sensing array of the optical encoder is directly irradiated by the environmental light when the optical encoder is in the abnormal state.

9. The optical encoder according to claim 8, wherein when the optical encoder is in the abnormal state, the images captured by the image sensing array are fuzzy, and the image quality decreases.

10. The optical encoder according to claim 8, wherein when the optical encoder is in the abnormal state, the environmental light directly irradiates the image sensing array, such that the optical encoder increases the shutter time, and the average brightness sensed by the image sensing array increases.

* * * * *